Oct. 14, 1947.  G. T. ATKINS, JR  2,429,115
HYDROGENATION PROCESS AND APPARATUS
Filed April 3, 1944
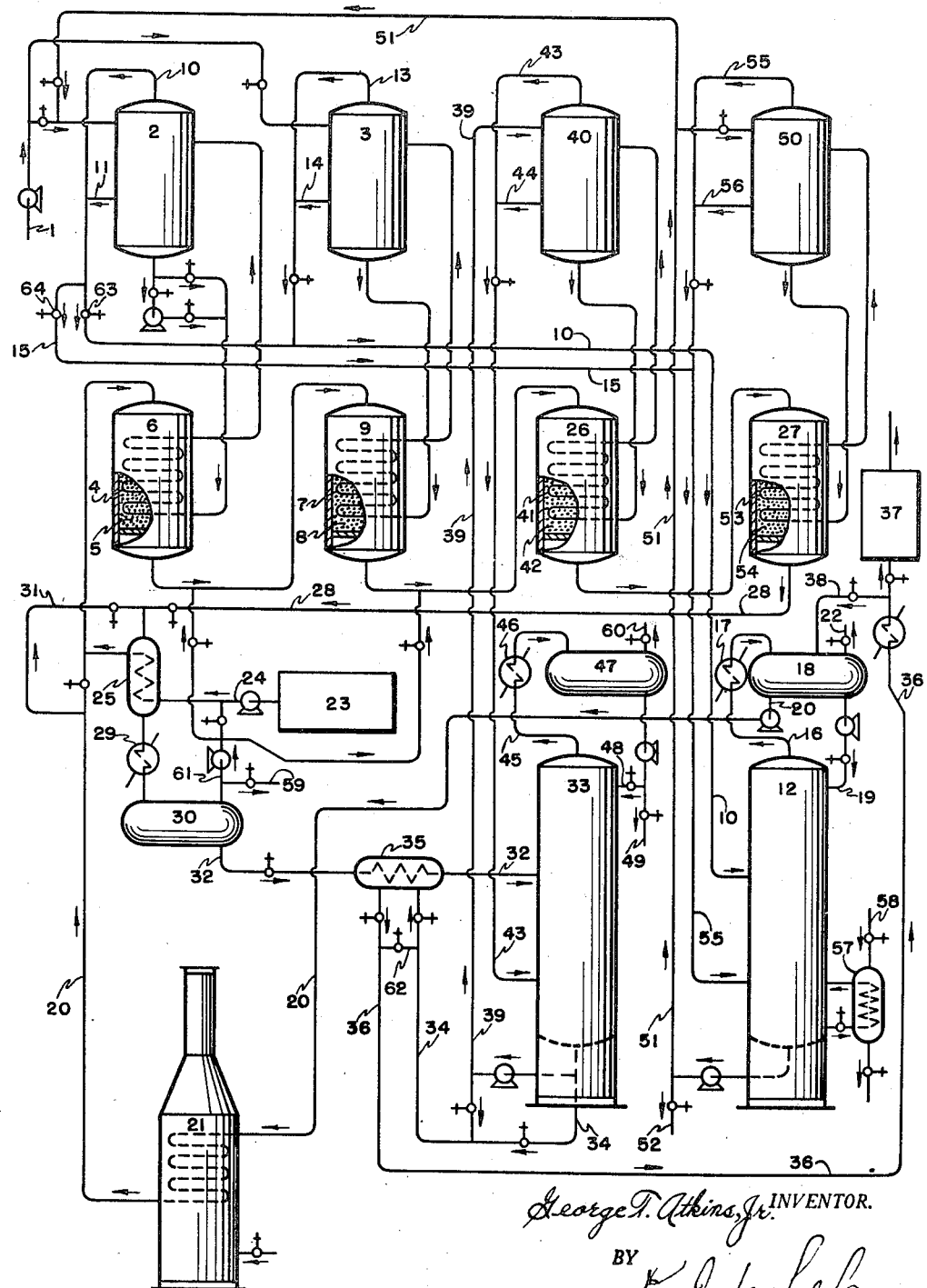
George T. Atkins, Jr. INVENTOR.
BY
ATTORNEY.

Patented Oct. 14, 1947

2,429,115

UNITED STATES PATENT OFFICE 2,429,115

HYDROGENATION PROCESS AND APPARATUS

George T. Atkins, Jr., Highlands, Tex., assignor to Standard Oil Development Company, a corporation of Delaware Application April 3, 1944, Serial No. 529,370

6 Claims. (Cl. 196—53)

The present invention is directed to exothermic reactions, and particularly to temperature control and heat conservation in such reactions. In exothermic reactions it is necessary, usually, to extract heat from the reaction zone in order to control reaction temperature. In addition, it is usually necessary to preheat the reactants in such reaction to reaction temperature. This has customarily been done by supplying cooling medium to the reaction zone and preheat to the feed stock.

Where separate heat control stages are used, there is a considerable waste of heat involved for obvious reasons. Even where the cooling stage is connected and is placed in communication with the preheating stage, it is usually necessary to replace portions of the circulating medium continuously with cool medium in order to maintain the desired control.

According to the present invention temperature control in exothermic reactions and efficient heat utilization are realized by utilizing the reaction material itself as the temperature control medium in a manner which makes possible a maximum utilization of the heat of reaction evolved. While the principle of operation of the present invention is applicable to many processes involving exothermic reactions and fractional distillation, it will, for ease of discussion, be hereinafter described with reference to the hydrogenation of hydrocarbons.

The present invention will be more clearly understood from the following detailed description of the accompanying drawing, in which the single figure is a front elevation in diagrammatic form of one embodiment thereof.

Referring to the drawing, it will be observed that there are four catalytic reactors connected in series, each provided with a cooling coil and a cooling tower. The feed stock contains hydrocarbons of different boiling points of which a selected cut is to be hydrogenated. As the feed enters the system, it has imparted to it the heat of reaction from the first two reactors, which, as will be evident, generate more heat of reaction than the last two reactors. The heat recovered from three of the reactors is used for the fractionation of the feed stock for the production of the cut to be hydrogenated, while the heat recovered from the fourth reactor is used for fractionation of the product. Thus, the two objects of heat recovery and temperature control are simultaneously realized.

Tracing the flow of hydrocarbons through this system, the hydrocarbon feed is introduced by way of line 1 and is discharged into the upper portions of two cooling towers 2 and 3. The condensate from cooling tower 2 is circulated through a coil 4, embedded in catalyst 5 in reactor 6, and is reintroduced into the upper portion of tower 2, carrying with it exothermic heat of reaction picked up in reactor 6. This heat effects vaporization, not only of certain constituents of the circulated condensate itself, but also causes the lighter ends of the fresh feed to flash off. This vaporization causes a reduction in temperature of the condensate so as to enable it to pick up additional heat of reaction on its next cycle. Similarly, in tower 3 the condensate is circulated through a coil 7, embedded in catalyst 8 in reactor 9, and then reintroduced into the upper portion of tower 3.

From the top of tower 2 the vapors are drawn off through line 10 and, augmented by a portion of the condensate drawn off through line 11, are discharged into an intermediate point of fractionator 12 through line 10. Likewise, the vapors from tower 3 are drawn off through line 13 and, augmented by condensate from this tower drained off through line 14, are discharged into line 10. If desired, a portion of the fluid in line 10 can be sent through a branch line 15, discharging into fractionator 12 at a different point. It will be understood that any distribution of the hydrocarbons drawn off from towers 2 and 3 can be followed in fractionator 12 by the use of suitable branch lines or manifolds.

The outlet vapors from fractionator 12 are conducted by line 16 into a condenser 17 and thence to a separator 18. A portion of the condensate in the separator may be returned by line 19 as reflux to the fractionator, while another portion is pumped through line 20 to heater 21 and thence through the catalytic reactors 6, 9, 26 and 27 in series, generally in vapor phase. By properly selecting the operating pressure in tower 12 and the cooling medium temperature in condenser 17, the desired amount of preheat may be provided to the condensate pumped through line 20. The uncondensed material in separator 18 is discarded from the system through line 22. Hydrogen for the reaction is furnished by a hydrogen generator 23 through line 24 after picking up heat in exchanger 25 from the reaction product. Vaporization of the feed liquid is obtained by a combination of heating, and flashing in the presence of the hydrogen gas.

After passing through reactors 6, 9, 26 and 27, the hydrogenated hydrocarbons, in this case in vapor phase, are conducted from the bottom of reactor 27 by line 28 through heat exchanger 25 and cooler 29 to a separator 30. A line 31 containing a valve permits by-passing feed directly to line 28 in case a sudden reduction in reaction rate is required. The valve is normally closed to prevent by-passing.

The condensate from separator 30 is discharged by way of line 32 into an intermediate point of stabilizer 33. The uncondensed material from separator 30 is discharged from the system through line 59 or recycled in part to the hydrogen line by line 61.

The bottoms from the stabilizer is divided into two portions, the one passing through line 34 into heat exchanger 35 arranged in line 32, where part of the heat required for stabilizing the condensate from separator 30 is recovered from said bottoms, which is then conducted by line 36 to further refining equipment, such as a caustic treater 37. If desired, a portion of this product may be reintroduced into the system for further hydrogenation by a branch line 38, connecting line 36 to the separator 18.

The other portion of the bottoms from stabilizer 33 is fed by line 39 into the top of cooling tower 40, provided for reactor 26. The condensate from tower 40 is passed through coil 41, embedded in catalyst 42 in reactor 26, and reintroduced into the upper portion of tower 40. The vapors from this tower are drawn off by line 43 and, augmented by a portion of the condensate by way of branch line 44, are returned to the stabilizer 33, where they supply additional heat, recovered as exothermic heat of reaction in the reactor 26 for the stabilization of the product.

The vaporous effluent from stabilizer 33 is taken off overhead by line 45, passed through condenser 46 and discharged into separator 47, the condensate from which may be reintroduced into the top of stabilizer 33 as reflux by line 48 or removed from the system as light distillate by way of line 49. The uncondensed material from separator 47 is discharged from the system through line 60.

For temperature control in the last reactor 27, there is provided a cooling tower 50, into the upper portion of which is introduced a portion of the bottoms from fractionator 12 by way of line 51. Another portion of the bottoms may be returned by line 51 to the top of cooling tower 2, while still another portion is discarded from the system through line 52. In one type of operation bottoms from fractionator 12 is fed to the top of tower 2, valve 63 in line 10 is closed, valve 64 in line 15 is opened, and vapors and condensate from tower 2 are fed by line 15 into fractionator 12 below its stripping section. In this case, fresh feed goes directly into tower 3, by-passing tower 2.

The condensate in tower 50 is passed through coil 53, embedded in catalyst 54 in reactor 27, and returned to the upper portion of the cooling tower. The overhead from this tower, conducted by line 55, and augmented by a portion of the condensate by way of line 56, is returned to an intermediate portion of fractionator 12, after being mixed, if desired, with the contents of line 15. Additional heat may be introduced into the system, if required, by providing a reboiler 57 for the bottoms in fractionator 12 and operating the reboiler by an auxiliary heating medium introduced by way of line 58.

As will be seen from the foregoing description, liquid feed stock and liquid product and their derivative streams in the process are used to a special advantage to improve the control of the process, to act efficiently in the conservation of heat, and to reduce the cost of the apparatus required. It would normally be expected that the various stages of heat exchange could be more efficiently operated by the use of specially selected heat exchange mediums chosen on the basis of their physical properties and chemical stability. It is the principal feature of this invention that by utilizing the material undergoing reaction in the manner described, an unexpected thermal efficiency and heat conservation are realized.

It has been found that for reactor temperatures of 400° to 600° F. the operating temperatures and pressures of the cooling towers fall in very convenient ranges for the direct transfer of the excess vapor and liquid streams of the distilling columns. A full control over the temperature of the cooling medium is obtained by varying the setting of the back pressure valves on the outlet lines of the cooling towers, thus varying the vapor pressure and the temperature of the boiling and cooling medium.

It will be observed that, in effect, the heat of reaction of the various catalytic reactors is utilized for supplying the heat of fractionation of the fresh feed either by imparting this heat to the feed to the fractionator or imparting it to the bottoms of the fractionator. This suggests that a further range of control may be obtained by connecting the cooling towers in a different manner, as by using only one tower, or even none, for preheating fresh feed and by using the remainder, or all of them, for reboiling the bottoms of the fractionating tower 12. Here advantage is taken of the difference in boiling point of the feed and of the undesirable bottoms components. Either lower or higher temperature ranges can be obtained by conducting the vaporization and distillation at appropriate pressures.

By the use of feed and product for temperature control in the manner described, an improved degree of control and operability is obtained. Thus, if the feed rate becomes accidentally less than normal, then there is a simultaneous reduction in the reactor through-put and in the quantity of makeup cooling medium; that is, there is a simultaneous reduction in the evolved heat of reaction and in the vapor evolution. There is then, also, a reduced heat input to the fractionating tower and a reduced feed rate to this tower. Thus, the effects are compensating so that the system more or less runs itself and but few changes in instrument settings become necessary.

The same considerations apply to the operation of the stabilizing equipment. Again heat requirement and heat supply automatically balance. An additional and independent setting to control heat input to the stabilizer may be provided in the form of a by-pass 62 around heat exchanger 35, which recovers heat from the bottoms from the stabilizer.

It will be apparent that the specific embodiment described can, as has already been indicated, be varied considerably without departing from the principle underlying the present invention. This principle is to utilize the exothermic heat of reaction as the heat supply for other processing steps which consume heat and involve separation of the reaction material into components by distillation, and in turn utilizing the consumption of heat by such other processing steps as a means for controlling the reaction temperature in the exothermic stage of the reaction, preferably, in a manner which involves direct mixing of the cooling medium from the exothermic stage with the material undergoing such other processing steps, thereby taking full advantage of latent heats of vaporization and condensation.

The nature and objects of the present invention having been thus described and illustrated, what I desire to claim as new and useful and to secure by Letters Patent is:

1. In the hydrogenation of hydrocarbons the steps of introducing the raw hydrocarbon feed into a separation zone, feeding the bottoms from said separation zone through the hydrogenation zone in indirect heat exchange relation with the reaction material of said latter zone, reintroducing said bottoms into said separation zone, recovering a fraction from the overhead from said separation zone and feeding said fraction through said hydrogenation zone in admixture with hydrogen.

2. In the hydrogenation of hydrocarbons in which the raw hydrocarbon material is subjected to fractionation to separate therefrom a distillate which is hydrogenated in a plurality of hydrogenation zones in sequence and the product is also subjected to fractionation to separate a distillate therefrom, the steps of utilizing the heat of reaction from at least one of said hydrogenation zones for reboiling the bottoms of the raw material fractionation and utilizing the heat of reaction of at least one of the remaining hydrogenation zones for reboiling the bottoms of the product fractionation.

3. In a hydrogenation apparatus, in combination, a pair of reactors in series and a fractionator, a catalyst bed in each reactor, a coil embedded in each catalyst bed, means for passing the raw material to be hydrogenated through the coil in the second reactor, means for discharging the effluent in said coil into the fractionator at an intermediate point thereof, means for passing the bottoms from said fractionator through the coil in the first reactor, means for discharging the effluent from said coil into said fractionator at a point below the point of discharge of the effluent from the coil in the second reactor, means for recovering an overhead fraction from said fractionator and means for passing said fraction through said catalyst beds in series.

4. In a hydrogenation apparatus, in combination, two reactors in series, a catalyst bed in each reactor, a coil embedded in each catalyst bed, a fractionator associated with each reactor, means for passing raw reaction material through the coil of said first reactor, means for discharging the effluent from said coil into the fractionator associated with said first reactor, means for recovering an overhead fraction from said fractionator, means for passing said overhead fraction through said catalyst beds in sequence, means for discharging the effluent from said second catalyst bed into the fractionator associated with said second reactor, means for passing the bottoms of said second fractionator through the coil in said second reactor, means for discharging the effluent from said coil in said second reactor into the fractionator associated with said reactor and means for recovering an overhead product from said second fractionator.

5. In a chemical process in which hydrocarbons are subjected to an exothermic reaction in an exothermic zone, the steps of introducing raw hydrocarbon feed into a separation zone, feeding the bottoms from said separation zone through the exothermic reaction zone in indirect heat exchange relation with the reaction material of said latter zone, reintroducing said bottoms into said separation zone, recovering a fraction from the overhead from said separation zone and feeding said fraction into said exothermic reaction zone to cause at least a portion thereof to undergo exothermic reaction in said zone.

6. In the exothermic reaction of hydrocarbons in which the raw hydrocarbon material is subjected to fractionation to separate therefrom a distillate which is caused to react exothermically in a plurality of exothermic reaction zones in sequence and the product is also subjected to fractionation to separate a distillate therefrom, the steps of utilizing the heat of reaction from at least one of said exothermic reaction zones for reboiling the bottoms of the raw material fractionation and utilizing the heat of reaction of at least one of the remaining exothermic reaction zones for reboiling the bottoms of the product fractionation.

GEORGE T. ATKINS, JR.

REFERENCES CITED

The following references are of record in the file of this patent:

UNITED STATES PATENTS

| Number | Name | Date |
|---|---|---|
| 1,974,057 | Steffen et al. | Sept. 18, 1934 |
| 2,209,346 | McCausland | July 30, 1940 |
| 2,270,027 | Alther | Jan. 13, 1942 |
| 2,224,631 | Gary | Dec. 10, 1940 |
| 1,872,011 | Russell | Aug. 16, 1932 |

FOREIGN PATENTS

| Number | Country | Date |
|---|---|---|
| 9,505/32 | Australia | Oct. 4, 1933 |
| 359,027 | Great Britain | Oct. 15, 1931 |
| 737,103 | France | Dec. 27, 1932 |

OTHER REFERENCES

Societe Belge, 1st. addition No. 50,101 to (Fr.) 847,095 (1 sheet-2 pages). 196—53.